Patented Mar. 25, 1924.

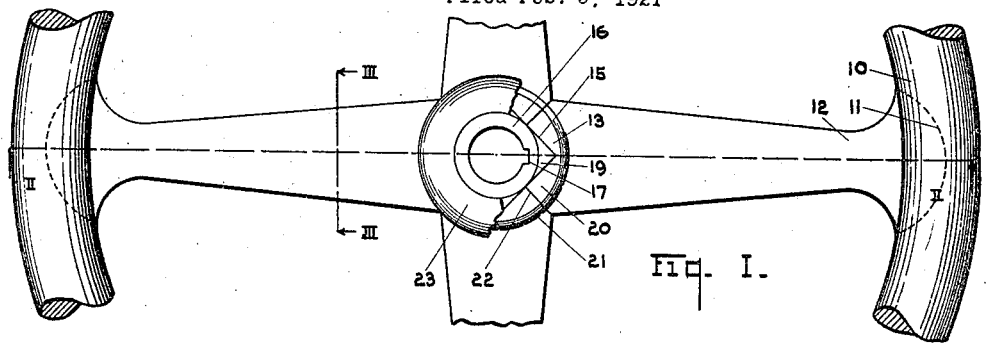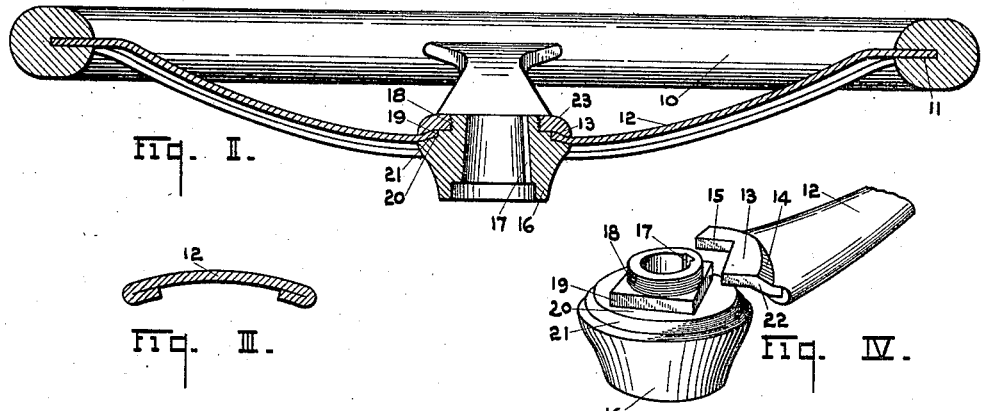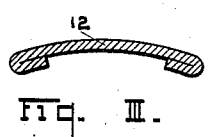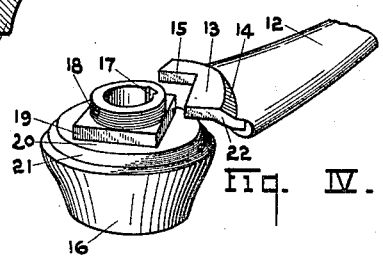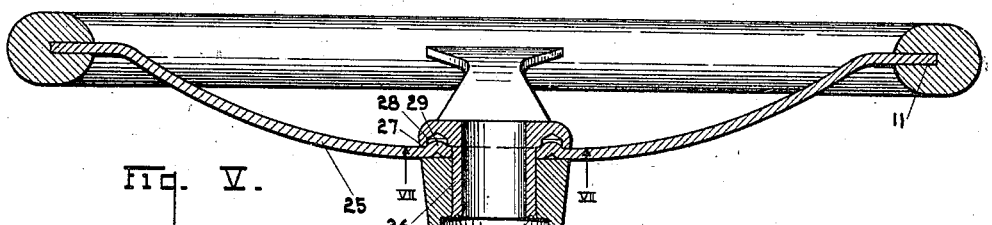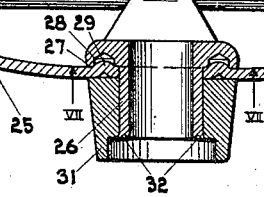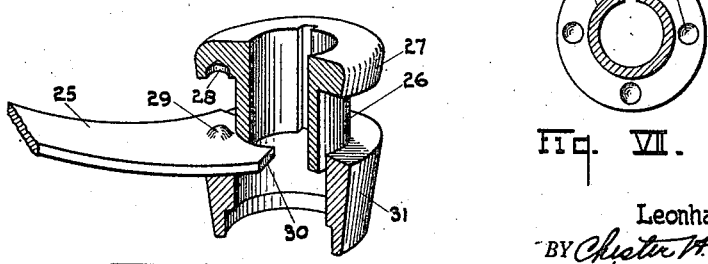

1,488,308

UNITED STATES PATENT OFFICE.

LEONHARD BAUROTH, OF TOLEDO, OHIO, ASSIGNOR TO THE WILLYS-OVERLAND COMPANY, OF TOLEDO, OHIO, A CORPORATION OF OHIO.

HANDWHEEL.

Application filed February 3, 1921. Serial No. 442,227.

*To all whom it may concern:*

Be it known that I, LEONHARD BAUROTH, residing at Toledo, county of Lucas, and State of Ohio, have invented certain new and useful Improvements in Handwheels, of which I declare the following to be a full, clear, and exact description.

This invention relates to improvements in hand wheels, particularly automobile steering wheels.

One of the objects of the invention is the provision of a wheel, the several parts of which may be manufactured at a comparatively small cost, which is very readily and quickly assembled, and which at the same time is strong, durable and of excellent appearance.

Another object is the provision of sheet metal spokes or arms of such cross-sectional shape as to withstand a heavy load in the direction in which loads are applied in an automobile steering wheel, thus making possible the use of metal of a thinner gauge than could otherwise be employed.

A further object is the provision of a structure for the center of the wheel in which the separate arms may be tightly clamped to prevent movement in all directions.

Objects relating to details of construction and economies of manufacture, and other objects, will appear as I proceed with the description of that embodiment of the invention which, for the purposes of the present application, I have illustrated in the accompanying drawings, in which:

Figure I is a top plan view of a portion of an automobile steering wheel embodying my invention.

Figure II is a vertical section taken on the line II—II of Figure I.

Figure III is a vertical, transverse section of one of the wheel spokes or arms, the view being taken on the line III—III of Figure I.

Figure IV is a detail, perspective view showing the hub and one arm in position to be assembled.

Figure V is a vertical, diametrical section of a wheel illustrating a modification of the invention.

Figure VI is a fragmental perspective of the central part of the structure shown in Figure V, the elements being illustrated in the process of assembly, and partially broken away in order to more clearly illustrate the invention.

Figure VII is a horizontal section taken on the line VII—VII of Fig. V.

Like reference characters refer to similar parts throughout the views.

In the drawings 10 indicates the rim of an automobile steering wheel. The rim is preferably made of wood, although other material might be employed. Sockets 11 are cut into the rim from the inner sides at regularly spaced points around the wheel corresponding in number to the number of spokes or arms, which in a steering wheel is usually four.

Referring now particularly to the structure shown in Figures I and IV inclusive, 12 are separate spokes or arms made of sheet metal having the qualities of resilience and great strength. For this purpose steel has been found to be highly satisfactory. Each arm is bowed transversely so as to assume the shape illustrated in cross section in Figure III, and its edges are bent under and back upon itself, thereby eliminating sharp corners as well as reinforcing the arm. These turned edges terminate just short of the ends of the arms. The outer ends of the arms are shaped to conform to the shape of the recesses 11 into which they are forced in the assembly of the wheel, the fit being preferably quite snug.

The inner ends 13 of the arms are offset somewhat as shown in Figure IV, and the connection 14 between the offset 13 and the main portion of the arm 12 is inclined and curved so as to take the form of a quarter section of a conical ring. The offset portion 13 is notched at 15, the angle of the notch being 90° in a four-arm wheel.

The hub of the wheel is shown at 16. It is provided with a keyway 17 by means of which it is adapted to be locked against turning upon the steering post. The upper end of the hub is reduced considerably and screw threaded as shown at 18. Just below this threaded portion is a flat sided portion 19 having sides equal in number to the number of spokes or arms 12. Below the portion 19, which, in the present instance, is rectangular, there is a circular portion of large diameter providing a shoulder 20 upon which the offset parts 13 of the arms are adapted to rest. From the outer edge of this shoulder the hub inclines downwardly and outwardly forming a conical surface 21 of the same inclination as the portion 14 of the arms. When the hub and arms are in assembled position with the notches 15 of the arms engaging with the corners of the rectangular portion 19 of the hub, and the side edges 22 of each arm abutting against the side edges of the adjacent arms, these parts are fastened together by a nut 23 which is threaded upon the portion 18 of the hub, and which on its lower side has an inner flat and an outer inclined surface to engage the correspondingly shaped parts 13 and 14 of the arms.

The arms 12 are made of such length that when they are unflexed before the hub is put into place, the distance between the inner ends of opposite arms is slightly less than the distance between their seats on the hub, that is to say the distance between the bottoms of the notches 15 is then less than the distance from one corner to the rectangular portion 19 to the diametrically opposite corner. In order to mount the hub it is necessary to flex the arms sufficiently to enable the operator to push the rectangular portion of the hub into position within the notches 15 whereupon the nut 23 may be screwed down to secure the parts together. It will be apparent, however, that the arms still remain slightly flexed and consequently tend to expand lengthwise. This tendency to expand is the force that is made use of for holding the outer ends of the arms in place in the rim. The nut 23, by means of its inclined surface, presses the inclined portion 14 of the arms against the inclined surface 21 of the hub and thereby holds the arms against outward movement as well as against axial or angular movement, the latter being prevented by the engagement of the notches 15 with the corners of the square portion 19 of the hub. The amount of flexure in the arms 12, necessary in assembling the wheel, is relatively slight, and smaller by many times than that which would be necessary to withdraw the arms from their sockets in the rim. Furthermore, while the arms are resilient and may be bent readily by the use of special tools and forms to a degree sufficient for assembling purposes, still because of their bowed cross-sectional form they are capable of withstanding the heaviest strains to which they may be subjected in ordinary use without changing their longitudinal curve perceptibly.

In the modifications illustrated in Figures V and VII, the arms 25 are not arched transversely, but are made of a heavier gauge metal in order to withstand the same strains as in the case of the above described form of the invention. Otherwise this modification differs from the first only in the hub construction and the means of attachment of the arms thereto. The hub 26 is formed with an outwardly extending flange 27 at its upper end, and in the lower face of this flange are formed equally spaced sockets or depressions 28, one for each arm. The inner ends of the arms have upwardly extending projections or bosses 29 adapted to fit in the depressions 28. The arms are so proportioned that their sides abut in the same manner as do the side edges 22 of the first modification. 31 is a clamping member which holds the arm 25 against the flange 27 and the projections 29 in their respective depressions 28. I prefer to mount it upon the hub by means of a driving fit, and then to use a prick punch upon the lower ends of the hub as indicated at 32 in order to turn the metal of the hub over against the lower end of the clamping member, thus riveting the two together and providing additional assurance against any loosening of the parts.

The method of assembly of this second form of the invention is similar to that of the first described form, the arms 25 being first inserted in the rim sockets 11 then flexed sufficiently to enable the operator to position the hub 26 between the inner ends of the arms. Then, after the proper location of the projections 29 within the depressions 28 has been accomplished, the clamping member 31 is driven into place and the punch marks 32 are made.

While I have shown and described in considerable detail certain specific embodiments of the invention, it is to be understood that this showing and description are illustrative only, and for the purpose of rendering the invention clear, and that I do not regard the invention as limited to the details of construction illustrated or described, or any of them, except in so far as I have included such limitations within the terms of the following claims in which it is my intention to claim all novelty inherent in the invention broadly as well as specifically.

What I claim as new and desire to secure by Letters Patent is:

1. In a hand wheel, a rim, separate and independently mounted spokes or arms of resilient material, each having a projection and socket connection with said rim, a hub member comprising an exterior surface against which the inner ends of the arms bear, said hub member and each of said arms having engaging portions adapted to prevent relative rotation between the hub and any of the arms, the said exterior surface being slightly greater in diameter than the distance between opposing arms in their unflexed position, whereby the resilience of the arms tends to hold all these parts in fixed relation, and a single clamping member for securing the arms upon said hub member.

2. In a hand wheel, a hub having a bearing surface lying in a plane at right angles to the axis of the hub, a plurality of separate spokes or arms having their inner ends resting upon said bearing surface, said hub having a polygonal portion adjoining said bearing surface, the inner ends of the arms being notched to receive the corners of said polygonal portion, and a clamping member adapted to retain the arms in place upon the bearing surface.

3. In a hand wheel, a hub having a bearing surface lying in a plane at right angles to the axis of the hub, a plurality of separate spokes or arms having their inner ends resting upon said bearing surface, said hub having a polygonal portion adjoining said bearing surface, said polygonal portion having sides equal to the number of arms, the inner ends of the arms being notched to receive the corners of said polygonal portion, each arm at its side edges being formed to bear against the adjacent arm, and a clamping member adapted to retain the arms in place upon the bearing surface.

4. In a hand wheel, a hub, a plurality of separate spokes or arms, said hub being provided with a conical surface and each of the arms having a fragment of a corresponding conical surface, and a clamping member mounted upon said hub and provided with a conical surface adapted to press the corresponding surfaces of the arms against the conical surface of the hub.

5. In a hand wheel, a hub, a plurality of separate spokes or arms, said hub being provided with a conical surface and each of the arms having a fragment of a corresponding conical surface and a clamping member mounted upon said hub and provided with a conical surface adapted to press the corresponding surfaces of the arms against the conical surface of the hub, and means for preventing relative rotation between said hub and any of said arms.

6. In a hand wheel, a hub, a plurality of separate spokes or arms, said hub being provided with a conical surface and each of the arms having a fragment of a corresponding conical surface, and a clamping member mounted upon said hub and provided with a conical surface adapted to press the corresponding surfaces of the arms against the conical surface of the hub, said hub member and each of the arms having engaging portions adapted to prevent relative rotation between the hub and any of the arms.

In testimony whereof, I affix my signature.

LEONHARD BAUROTH.